F. J. LEWIS.
HOSE AND PIPE COUPLING.
APPLICATION FILED AUG. 4, 1914.
1,193,162.  Patented Aug. 1, 1916.
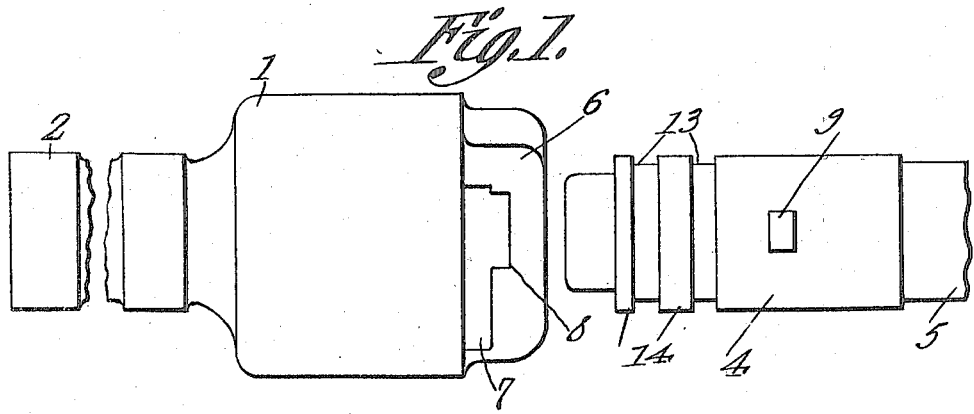
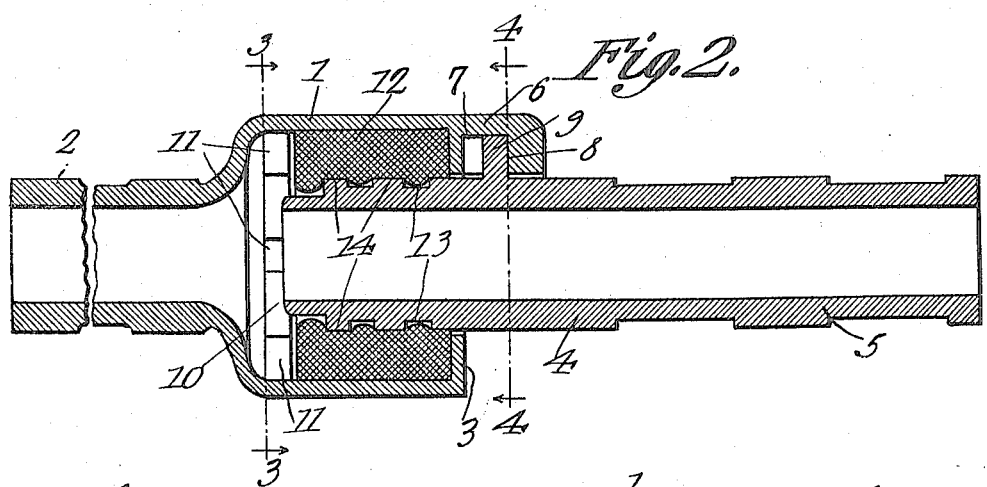
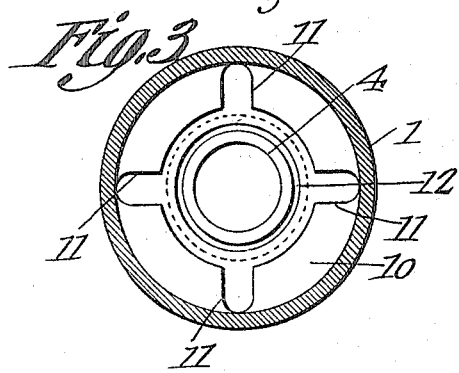
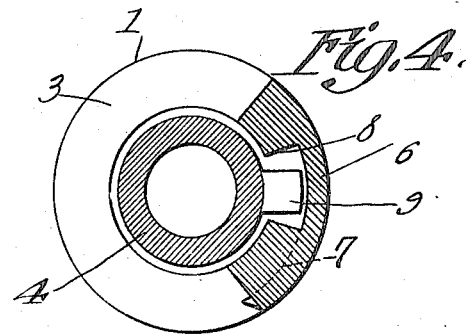
F. J. Lewis, Inventor
Witnesses
by Attorneys

UNITED STATES PATENT OFFICE.

FITZ JAMES LEWIS, OF COROZAL, CANAL ZONE.

HOSE AND PIPE COUPLING.

1,193,162.          Specification of Letters Patent.          Patented Aug. 1, 1916.

Application filed August 4, 1914. Serial No. 855,018.

*To all whom it may concern:*

Be it known that I, FITZ J. LEWIS, a citizen of the United States, residing at Corozal, Canal Zone, Isthmus of Panama, have invented a new and useful Hose and Pipe Coupling, of which the following is a specification.

The present invention appertains to hose and pipe couplings, and aims to provide a novel and improved device of that character.

It is the object of this invention, to provide a hose and pipe coupling wherein the coupling members are so constructed, as to be capable of easy and quick assemblage and separation, novel means being provided for effecting a pressure-tight joint when the coupling members are assembled, and whereby the detachment of the members or parts will be rendered difficult, if not impossible, when they are assembled and subject to internal pressure.

It is also within the scope of this invention, to provide a coupling which may be employed for divers purposes, which will be inexpensive, durable, and simple in construction, which will not be liable to get out of order, which will be devoid of screw threads, and the parts of which may be formed or molded with little or no machine work being necessary.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:

Figure 1 is a side elevation of the coupling with the parts or members separated, and a portion of the male coupling member being broken away. Fig. 2 is a longitudinal section of the coupling with the parts or members assembled. Figs. 3 and 4 are cross sections taken on the lines 3—3 and 4—4, respectively, of Fig. 2.

In carrying out the present invention, there is provided a female coupling member 1 having a reduced nipple 2 of any suitable character for the attachment of a hose, pipe, nozzle, or the like, and which is provided at its mouth with an annular inturned flange 3 through which the male coupling member 4 is insertible. The male coupling member 4 is of tubular construction, and is provided with any suitable nipple 5 for the attachment of a hose, pipe, nozzle, or the like, it being understood that the present coupling may be employed in numerous capacities.

In order to enable the female and male coupling members or sections to be securely locked together in assembled relation, the mouth end of the female member 1 is provided with a projecting arcuate lip 6 having a slot 7 in its inner side and extending from one end thereof adjacent the flange 3. The lip 6 is also provided with a notch or recess 8 at and leading from the inner end portion of the slot 7 opposite the flange 3, while the body portion of the male coupling member 4 is equipped with an outstanding lug 9 which is adapted to abut against the flange 3 when the male coupling member 4 is inserted into the female coupling member 1, and whereby when the coupling members are rotated relative to one another, the lug 9 will enter the slot or groove 7 and will finally engage or seat in the notch or recess 8. The slot 7 and notch 8 thus form a bayonet slot leading from one end of the lip 6 for the engagement of the lug 9.

The female coupling member 1 is provided with an integral inwardly projecting annular flange 10 between the flange 3 and the nipple 2, and the flange 10 is provided with a series of notches or open slots 11 leading from its inner edge to the walls of the member 1. An annular gasket 12 of rubber or other compressible and flexible material, is fitted snugly within the coupling member 1 between the flanges 3 and 10, whereby the flanges will retain the gasket in place so as to snugly receive the nipple or protruding end of the male coupling member 4 when the coupling members or parts are assembled.

The nipple or protruding portion of the male coupling member 4 is provided with a plurality of annular grooves 13 providing the annular collars or ribs 14 which are adapted to engage snugly within the gasket 12 when the members 1 and 4 are assembled.

In practice, when the coupling members 1 and 4 are assembled, the nipple portion of the coupling member 4 being inserted into the coupling member 1 will fit snugly within the gasket 12, and the lug 9 will strike the flange 3 to limit the movement of the coupling members together, and then by rotating the coupling members with respect to one another, the lug 9 may be moved into the bayonet slot 7—8 and seated within the tail portion or notch 8 of the bayonet slot to hold the coupling members against separation. Then, when the pressure fluid is permitted to flow through the coupling, the same will naturally tend to separate the coupling members 1 and 4, which will serve to hold the lug 9 within the notch or seat 8, to hold the coupling members locked together, and furthermore, the pressure fluid will flow through the slots or openings 11 of the flange 10 to compress the gasket 12. In this manner, the gasket will be forced against the flange 3, and will be contracted or compressed so that the inner portion of the gasket will be bulged into the grooves 13 and around the ribs 14 of the male coupling member 4, to effect a thoroughly pressure tight joint, and to render the separation of the coupling members difficult, if not impossible, while the coupling is subject to internal pressure. The gasket 12 is sufficiently soft or pliable to enable it to be compressed by the pressure of the fluid flowing through the coupling, and it will be observed that the greater the pressure of the fluid, the greater will be the binding action of the gasket 12 between the two coupling members.

When the gasket 12 is bulged into engagement with the grooves 13 and ribs 14 of the male coupling member, it will be evident that it will be difficult to move the male coupling member 4 toward the female coupling member to release the lug 9 from the notch 8, and consequently, it will be practically impossible to separate the coupling members from each other, either manually or accidentally, when the pressure fluid is flowing through the coupling. However, when the pressure in the coupling is relieved, the gasket 12 will resume its normal expanded position, so that the coupling members may be readily separated or detached, as will be apparent.

Since the gasket 12 provides for the pressure tight joint between the coupling members when they are assembled, the coupling members need not be machined or turned accurately, and this will render the coupling members capable of inexpensive manufacture. The coupling members are also devoid of threads for the purpose of attaching them together, although the attaching means provided will effectively serve its purpose for enabling the coupling members to be easily and quickly assembled and separated.

The present coupling being comparatively simple, will not be liable to get out of order, and the gasket 12 will be protected by the annular shell of the female coupling member 1 and the flanges 3 and 10 thereof. The other advantages and uses of the present invention will be obvious to those versed in the art, without further comment being deemed necessary.

Having thus described the invention, what is claimed as new is:—

A coupling comprising male and female members, the female member having an inturned annular flange surrounding its mouth, a second inner annular flange between its ends provided with openings extending to the periphery of said member, and an arcuate lip projecting from said first mentioned flange, a compressible gasket fitted snugly within the female member between said flanges, the male member being insertible loosely through the first mentioned flange to fit tightly within said gasket, said lip having an inner slot extending from one end thereof along said flange, said flange forming one wall of said slot, the male member having an outstanding lug between its ends arranged to strike said flange at any point thereof spaced from said lip when the female and male members are assembled, so that said lug can slide along said flange to be directed thereby into said slot, and that portion of the male member which fits within the gasket having annular grooves into which the gasket is adapted to bulge.

In testimony that I claim the foregoing as my own, I have hereto affixed my signature in the presence of two witnesses.

FITZ JAMES LEWIS.

Witnesses:
 IVY E. SIMPSON,
 C. E. DOYLE.

Copies of this patent may be obtained for five cents each, by addressing the "Commissioner of Patents, Washington, D. C."